United States Patent
Ohno et al.

(10) Patent No.: US 8,817,360 B2
(45) Date of Patent: Aug. 26, 2014

(54) METHOD FOR PRODUCING LIGHT-MODULATING FILM AND LIGHT-MODULATING FILM

(75) Inventors: Shigeshi Ohno, Chikusei (JP); Michio Ogawa, Hitachi (JP); Toshiaki Chiba, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 130 days.

(21) Appl. No.: 12/921,286

(22) PCT Filed: Mar. 5, 2009

(86) PCT No.: PCT/JP2009/054196
§ 371 (c)(1),
(2), (4) Date: Sep. 7, 2010

(87) PCT Pub. No.: WO2009/110563
PCT Pub. Date: Sep. 11, 2009

(65) Prior Publication Data
US 2011/0013260 A1    Jan. 20, 2011

(30) Foreign Application Priority Data
Mar. 5, 2008    (JP) .............................. P2008-054791

(51) Int. Cl.
G02B 26/00    (2006.01)
(52) U.S. Cl.
USPC ........................................................ 359/296
(58) Field of Classification Search
USPC .......... 359/237, 296, 265–275, 245; 345/107, 345/105
See application file for complete search history.

(56) References Cited

U.S. PATENT DOCUMENTS

| | | | |
|---|---|---|---|
| 2,041,138 | A | 5/1936 | Land |
| 2,306,108 | A | 12/1942 | Land et al. |

(Continued)

FOREIGN PATENT DOCUMENTS

| | | |
|---|---|---|
| EP | 0747461 | 12/1996 |
| WO | WO 2009/002647 | 12/2008 |

OTHER PUBLICATIONS

Transmittal of International Preliminary Report on Patentability dated Oct. 21, 2010 (English Translation of the Written Opinion of the International Searching Authority), for International (PCT) Application No. PCT/JP2009/054196.

(Continued)

Primary Examiner — Tuyen Tra
(74) Attorney, Agent, or Firm — Antonelli, Terry, Stout & Kraus, LLP.

(57) ABSTRACT

A method for producing a light-modulating film in which a light-modulating layer is sandwiched between two transparent resin substrates, the light-modulating layer being formed by use of a light-modulating material containing: a polymeric medium for forming a resin matrix; and a light-modulating suspension, includes the following steps: step (a) of applying the light-modulating material to one (a first transparent resin substrate: of the transparent resin substrates; step (b) of bonding the other transparent resin substrate (a second transparent resin substrate) onto the light-modulating material applied to the first transparent resin substrate; and step (c) of irradiating the light-modulating material sandwiched between the first transparent resin substrate and the second transparent resin substrate with an energy ray to cure the polymeric medium for forming the resin matrix contained in the light-modulating material, thereby forming the light-modulating layer to yield the light-modulating film.

19 Claims, 2 Drawing Sheets

(56) References Cited

U.S. PATENT DOCUMENTS

| | | | |
|---|---|---|---|
| 2,375,963 A | 5/1943 | Thomas | |
| 4,270,841 A | 6/1981 | Saxe | |
| 4,422,963 A | 12/1983 | Thompson et al. | |
| 6,128,056 A * | 10/2000 | Kubota et al. | 349/86 |
| 7,964,076 B2 * | 6/2011 | Kanbe | 204/600 |
| 8,282,762 B2 * | 10/2012 | Liang | 156/272.2 |
| 2006/0198991 A1 * | 9/2006 | Takiyama et al. | 428/172 |
| 2007/0195057 A1 * | 8/2007 | Aylward et al. | 345/107 |

OTHER PUBLICATIONS

Extended European Search Report dated Aug. 10, 2011, including Supplementary European Search Report and European Search Opinion, for EP Application No. 09718110.1-2205/2251739 (PCT/JP2009/054196).

Communication mailed Jun. 5, 2012, in connection with Japanese Patent Application No. 2010-501959, 2 pages, Japanese Patent Office, Japan.

* cited by examiner

METHOD FOR PRODUCING LIGHT-MODULATING FILM AND LIGHT-MODULATING FILM

TECHNICAL FIELD

The present invention relates to a method for producing a light-modulating film, and a light-modulating film. Specifically, the invention relates to a method for producing a light-modulating film which is preferably used in a window glass plate, various flat display elements, various alternate products for a liquid crystal display element, a light shutter, advertisement and guide indicating boards, glasses, sunglasses and others, and a light-modulating film.

BACKGROUND ART

A light-modulating material is a material having a light transmittance varied by whether or not an electric field is applied to the material and having an incident light quantity adjustable thereby. Known is, for example, a light-modulating film wherein: a light-modulating layer is sandwiched between two transparent resin substrates; and the light-modulating layer is a layer having a light-modulating suspension in which light-modulating particles responsible to an electric field are dispersed, and a resin matrix in which the light-modulating suspension is dispersed (see Japanese Patent Application National Publication (Laid-Open) No. 8-503314).

This light-modulating film is a film wherein fine droplets of the light-modulating suspension, in which the light-modulating particles are dispersed, are dispersed in the resin matrix cured by the irradiation with ultraviolet rays. In this light-modulating film, the light-modulating particles absorb, scatter or reflect light by the Brownian movement thereof in the state that no electric field is applied thereto. Thus, the film cannot transmit incident light into the film. When an electric field is applied thereto, the light-modulating particles are polarized to be arranged in a parallel direction, correspondingly to the electric field. As a result, the film can transmit light radiated into the film.

In such a way, the transmission quantity of light is adjusted in the response of the light-modulating particles to an electric field.

As such a light-modulating film, know is a film wherein a light-modulating layer is formed directly between glass plates: such as a film obtained by forming a light-modulating layer on a polyester sheet, curing this, transferring the sheet-attached cured layer onto a glass plate covered with ITO, peeling the polyester sheet, and then sandwiching the cured layer between the glass plate and another glass plate equivalent thereto, which is described in JP-T-8-503314; or a film formed by forming a light-modulating layer, about 50 μm in thickness, onto each of two glass substrates, each glass substrate having ITO applied thereonto, and then unifying these members in a vacuum (see Japanese Patent Application Laid-Open No. 9-113939). However, in such a method of forming a light-modulating layer directly onto a glass substrate, the working performance for forming the light-modulating layer onto a glass substrate is poor, especially, for example, when the glass substrate has a large area. Furthermore, the film thickness of the light-modulating layer is not easily made uniform; thus, it is difficult to yield a light-modulating film having a wholly uniform and excellent light-modulating performance.

As a light-modulating film for improving this, known is a light-modulating film obtained by applying a light-modulating material onto a polyester film having a surface on which an ITO transparent electrode film is formed, curing the light-modulating material to form a light-modulating layer, and then putting the resultant light-modulating layer attached film and a film which does not have any light-modulating layer onto each other, or putting light-modulating layer attached films yielded in the same way onto each other, so as to sandwich the light-modulating layer therebetween (see JP-A-2002-189123).

JP-A-2005-300962, JP-A-2006-64832 and so on include such an extensive description that the transparent substrates for sandwiching the light-modulating layer between them preferably have the thickness from 1 to 15 mm when the transparent substrates are each a glass piece, and the thickness from 10 to 1000 μm when the transparent substrates are each a polymeric film. However, sufficient investigations thereon are not made under the actual circumstances.

DISCLOSURE OF THE INVENTION

A method described in JP-A-2002-189123, wherein a polymeric film is used as a transparent substrate, which is different from the method wherein a light-modulating layer is laid directly onto a glass substrate, provides a flexible polymeric film into a roll form. As a result, a light-modulating film can be continuously formed, so that the method is excellent in working performance. Additionally, the method can provide a long light-modulating film having a uniform light-modulating layer. According to methods described in JP-A-2002-189123 and others, a light-modulating material is applied onto a polyester film having a surface on which an ITO transparent electrode film is formed, the light-modulating material is cured by the irradiation with ultraviolet rays so as to form a light-modulating layer, and subsequently the resultant light-modulating layer attached film and a film which does not have any light-modulating layer, or light-modulating layer attached films yielded in the same way are put onto each other to sandwich the light-modulating layer therebetween. Therefore, when the light-modulating material is cured by the irradiation with the ultraviolet rays, it is necessary to perform the curing in a vacuum or in an inert atmosphere in order to remove an effect of polymerization-inhibition based on oxygen. In this case, dependently on the remaining amount of oxygen, a resin-matrix-forming polymeric medium contained in the light-modulating material may not be sufficiently cured. Therefore, in order to avoid this, it is necessary to irradiate the workpiece with ultraviolet rays in a high-level degree vacuum or in an inert atmosphere filled sufficiently with an inert gas. Thus, there remains a problem that the production process is complicated and a large-scale apparatus is required.

In the method, cured light-modulating layers formed on polyester films, respectively, are bonded to each other; thus, the adhesiveness therebetween lowers. Furthermore, an interface is generated between the bonded surfaces so that a high transmittance cannot be easily obtained when an electric field is applied thereto. The method has a problem that the haze (turbidity) of the light-modulating film becomes high. In order to solve such problems based on the bonding, it is supposed to adopt a method of laminating, directly onto a cured light-modulating layer formed on a polyester film, a different polymeric film. In this case, however, there is a problem that the adhesiveness between the cured light-modulating layer and the polymeric film is poor so that the two are easily peeled off from each other.

The invention can solve such problems, and provide a producing method for obtaining a light-modulating film having a wholly uniform external appearance and an excellent adhesiveness between the light-modulating layer and the transparent resin substrate.

The inventors have made eager investigations so as to find out that the problems can be solved. Thus, the invention has, as its features, the subject matters described in the following items [1] to [7]:

[1] A method for producing a light-modulating film in which a light-modulating layer is sandwiched between two transparent resin substrates, the light-modulating film being formed by use of a light-modulating material containing: a polymeric medium for forming a resin matrix; and a light-modulating suspension, the method comprising the following steps (a) to (c):

The step (a) of applying the light-modulating material to one (a first transparent resin substrate) of the transparent resin substrates;

the step (b) of bonding the other transparent resin substrate (a second transparent resin substrate) onto the light-modulating material applied to the first transparent resin substrate; and the step (c) of irradiating the light-modulating material sandwiched between the first transparent resin substrate and the second transparent resin substrate with an energy ray to cure the polymeric medium for forming the resin matrix contained in the light-modulating material, thereby forming the light-modulating layer to yield the light-modulating film.

[2] The method for producing a light-modulating film according to item [1], comprising the step of applying the light-modulating material beforehand to the second transparent resin substrate before the step (b).

[3] The method for producing a light-modulating film according to item [1] or [2], wherein the workpiece is pressed from either the first transparent resin substrate side thereof or from the second transparent resin substrate side thereof in the step (b).

[4] The method for producing a light-modulating film according to item [1] or [2], wherein the workpiece is pressed from both of the first transparent resin substrate side thereof and the second transparent resin substrate side thereof in the step (b).

[5] The method for producing a light-modulating film according to any one of items [1] to [4], wherein the workpiece is irradiated with the energy ray from both of the first transparent resin substrate side thereof and the second transparent resin substrate side thereof in the step (c).

[6] The method for producing a light-modulating film according to any one of items [1] to [5], wherein the first transparent resin substrate is wound out from a roll in the step (a), and the second transparent resin substrate is wound out from a roll in the step (b), the method further comprising the step of winding up the light-modulating film yielded in the step (c) around a roll.

[7] A light-modulating film produced by the light-modulating film producing method according to any one of items [1] to [6].

According to the method for producing a light-modulating film of the invention, a light-modulating film can be obtained which has a wholly uniform external appearance and an excellent adhesiveness between the light-modulating layer and the transparent resin substrate.

The disclosure of the invention is relevant to the subject matters described in Japanese Patent Application No. 2008-054791 filed on Mar. 5, 2008, and the disclosed contents thereof are incorporated herein by reference.

BEST MODE FOR CARRYING OUT THE INVENTION

Figure 1:
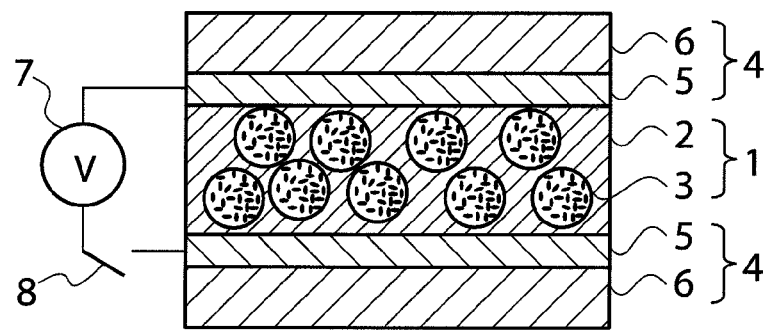
FIG. 1 is a schematic view of a sectional structure of an aspect of a light-modulating film of the invention.

The invention will be described in detail hereinafter.

The invention is a method for producing a light-modulating film in which a light-modulating layer is sandwiched between two transparent resin substrates, the light-modulating film being formed by use of a light-modulating material containing: a polymeric medium for forming a resin matrix; and a light-modulating suspension, the method comprising the following steps (a) to (c):

The step (a) of applying the light-modulating material to one (a first transparent resin substrate) of the transparent resin substrates, the step (b) of bonding the other transparent resin substrate (a second transparent resin substrate) onto the light-modulating material applied to the first transparent resin substrate, and the step (c) of irradiating the light-modulating material sandwiched between the first transparent resin substrate and the second transparent resin substrate with an energy ray to cure the polymeric medium for forming the resin matrix contained in the light-modulating material, thereby forming the light-modulating layer to yield the light-modulating film.

The light-modulating film of the invention is formed by sandwiching a light-modulating layer between at least two transparent resin substrates. The light-modulating layer of the invention is formed by use of a light-modulating material wherein droplets of a light-modulating suspension having a light-modulating performance are dispersed in a polymeric medium for forming a resin matrix.

The polymeric medium forms a resin matrix by being irradiated with an energy ray to be cured. The light-modulating suspension has light-modulating particles, and a dispersing medium wherein the light-modulating particles can flow.

In the state that no electric field is applied to the light-modulating film, the light-modulating particles floated and dispersed in the droplets of the light-modulating suspension in a flowing state, absorb, scatter or reflect light by the Brownian movement thereof, so that light rays radiated into the film can hardly be transmitted. However, when an electric field is applied to the light-modulating film, the light-modulating particles are arranged in a parallel direction, correspondingly to the electric field, since the light-modulating particles have an electrical dipolar moment. Thus, the film causes the light rays radiated into the film to be transmitted. In this way, the light-modulating particles make a response to the applied electric field, thereby making it possible to adjust the transmission quantity of the light rays.

The light-modulating material used in the light-modulating film will be described hereinafter.

<Light-Modulating Material>
<1>Light-Modulating Suspension

The light-modulating suspension in the invention is a substance wherein light-modulating particles are dispersed in a dispersing medium in the state that the particles can flow.

Examples of the light-modulating particles in the invention include: polyperiodides; inorganic fibers such as carbon fiber and carbon nanofiber; carbon nanotubes; metal-free phthalocyanine; and metal phthalocyanines each having, as a central metal thereof, copper, nickel, iron, cobalt, chromium, titanium, beryllium, molybdenum, tungsten, aluminum, chromium or the like. It is particularly preferred to use a polyperiodide.

The polyperiodide may be a polyperiodide produced by the reaction of the following material with iodine and a iodide: a material selected from the group consisting of pyrazine-2,3-dicarboxylic acid/dihydrate, pyrazine-2,5-dicarboxylic acid/dihydrate, and pyridine-2,5-dicarboxylic acid/monohydrate. The thus-obtained polyperiodide is, for example, a polyperiodide represented by the following general formula:

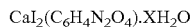

wherein X: 1 to 2, or

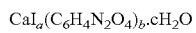

wherein a: 3 to 7, b: 1 to 2, and c: 1 to 3. The polyperiodide is preferably a needle crystal.

For the light-modulating particles, for example, compounds disclosed in the following may be used: U.S. Pat. No. 2,041,138 (E. H. Land); U.S. Pat. No. 2,306,108 (Land et al.); U.S. Pat. No. 2,375,963 (Thomas); U.S. Pat. No. 4,270,841 (R. L. Saxe); and GB Patent No 433,455. The compounds disclosed in these are each produced by selecting one from pyrazine carboxylic acids and pyridine carboxylic acids, and causing the selected acid to react with iodide so as to be turned to a polyhalide such as polyiodide, polychloride or polybromide. The polyhalide is a complex compound wherein a halogen atom reacts with an inorganic or organic material. Details of the production method thereof are disclosed in, for example, U.S. Pat. No. 4,422,963 issued to Saxe.

In the step of synthesizing the light-modulating particles, it is preferred to use a polymeric material such as nitrocellulose in order to make the size of the particles uniform and to improve the dispersibility of the light-modulating particles in the dispersing medium of the light-modulating suspension. When the light-modulating suspension is dispersed, in the form of fine droplets, into the cured polymeric medium, the use of the polymeric material such as nitrocellulose causes a tendency that the light-modulating particles are easily dispersed and floated in the fine droplets and that the responsibility to an electric field is improved.

In the invention, it is preferred to use, as the dispersing medium of the light-modulating suspension, a liquid copolymer which: fulfils a function of dispersing the light-modulating particles in a flowable state; adheres onto the light-modulating particles selectively to cover the particles so that at the time of phase separation from the polymeric medium as a resin matrix, the dispersing medium acts to cause the particles to be shifted to the phase-separated droplet phase; has neither electroconductivity nor affinity with the polymeric medium; and has a refractive index close to the refractive index of the resin matrix made from the polymeric medium when the dispersing medium are made into a light-modulating film. Specifically, the difference in refractive index between the resin matrix and the dispersing medium in the invention is preferably 0.005 or less, more preferably 0.003 or less.

Preferred is, for example, a (meth)acrylic acid ester oligomer having a fluoro group and/or a hydroxyl group, and more preferred is a (meth)acrylic acid ester oligomer having a fluoro group and a hydroxyl group. When such a liquid copolymer is used, the monomer units of either the fluoro group or the hydroxyl group are faced toward the light-modulating particles. The monomer units of the other group function to cause the light-modulating suspension to be stably kept as droplets in the polymeric medium. Therefore, the light-modulating particles are easily dispersed in the light-modulating suspension, and at the time of the phase separation the light-modulating particles are easily introduced into the phase-separated droplets.

The (meth)acrylic acid ester oligomer having the fluoro group and/or the hydroxyl group may be an oligomer obtained by copolymerizing a fluoro-group-containing monomer and a hydroxyl-group-containing monomer. Examples thereof include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, 1H,1H,2H,2H-heptadecafluorodecyl methacrylate/butyl acrylate/2-hydroxyethyl acrylate copolymer. These (meth)acrylic acid ester oligomers have each preferably both of the fluoro group and the hydroxyl group.

The weight-average molecular weight of these (meth)acrylic acid ester oligomers is preferably within the range from 1,000 to 20,000, more preferably within the range from 2,000 to 10,000, the molecular weight being a molecular weight in terms of standard polystyrene measured by gel permeation chromatography.

The use amount of the fluoro-group-containing monomer that is one of the starting materials of each of these (meth)acrylic acid ester oligomers is preferably from 6 to 12% by mole of the total of monomers that are the starting materials, more preferably from 7 to 8% by mole thereof. If the use amount of the fluoro-group-containing monomer is more than 12% by mole, the refractive index tends to become large so that the light transmittance falls. The use amount of the hydroxyl-group-containing monomer that is one of the starting materials of each of these (meth)acrylic acid ester oligomers is preferably from 0.5 to 22% by mole, more preferably from 1 to 8% by mole. If the use amount of the hydroxyl-group-containing monomer is more than 22% by mole, the refractive index tends to become large so that the light transmittance falls.

The light-modulating suspension in the invention contains the light-modulating particles preferably in an amount from 1 to 70% by mass, more preferably from 4 to 50% by mass. The light-modulating suspension contains the dispersing medium preferably in an amount from 30 to 99% by mass, more preferably from 50 to 96% by mass.

The light-modulating suspension is contained preferably in an amount from 1 to 100 parts by mass relative to 100 parts by mass of the polymeric medium, more preferably from 4 to 70 parts by mass, even more preferably from 6 to 60 parts by mass, in particular preferably from 8 to 50 parts by mass.

<2>Polymeric Medium

The polymeric medium, which forms the resin matrix in the light-modulating layer in the invention, is preferably a polymeric medium curable by the irradiation with an energy ray. In the invention, the polymeric medium curable by the irradiation with an energy ray is, for example, a polymeric composition containing a photopolymerization initiator, and a polymeric compound curable by an energy ray such as ultraviolet rays, visible rays or an electron ray.

The polymeric compound is, for example, a polymeric compound having substituents each having an ethylenically unsaturated bond.

The polymeric compound having substituents each having an ethylenically unsaturated bond is preferably a silicone resin, an acrylic resin, a polyester resin or the like from the viewpoint of easiness in the synthesis thereof, light-modulating performance, endurance and others. These resins preferably have, as the substituents thereof, alkyl groups such as methyl, ethyl, propyl, isopropyl, butyl, isobutyl, tert-butyl, amyl, isoamyl, hexyl or cyclohexyl groups, or aryl groups such as phenyl or naphthyl groups from the viewpoint of light-modulating performance, endurance and others.

Specific examples of the silicone resin include polymeric compounds described in Japanese Patent Application Publication No. 53-36515, JP-B-57-52371, JP-B-58-53656, and JP-B-61-17863.

The silicone resin is synthesized, for example, by subjecting the following compounds to dehydrogenation condensation reaction and dealcoholization reaction in the presence of tin 2-ethylhexane as an organotin catalyst:

a silanol both-terminated siloxane polymer, such as silanol both-terminated polydimethylsiloxane, silanol both-terminated polydiphenylsiloxane-dimethylsiloxane copolymer or silanol both-terminated polydimethyldiphenylsiloxane;

a trialkylalkoxysilane, such as trimethylethoxysilane; and an ethylenically-unsaturated-bond-containing silane compound, such as (3-acryloxypropyl)methyldimethoxysilane, or the like. The form of the silicone resin is preferably a solvent-free form. In other words, when a solvent is used to synthesize the silicone resin, it is preferred to remove the solvent after the synthesis reaction.

In the charging and blending of the individual starting materials when the silicone resin is produced, the use amount of the ethylenically-unsaturated-bond-containing silane compound, such as (3-acryloxypropyl)methoxysilane, is set preferably within the range of 19 to 50% by mass of the total of the starting siloxane and the silane compound, more preferably in that of 25 to 40% by mass thereof.

The acrylic resin can be yielded, for example, by copolymerizing a main-chain-forming monomer such as an alkyl (meth)acrylate, an aryl (meth)acrylate, benzyl (meth)acrylate or styrene with a functional-group-containing monomer for introducing an ethylenically unsaturated bond, such as (meth)acrylic acid, hydroxyethyl (meth)acrylate, isocyanatoethyl (meth)acrylate or glycidyl (meth)acrylate, or some other monomer, so as to synthesize a prepolymer once; and then subjecting the following monomer to addition-react with the prepolymer in order to subject the monomer to react with the functional groups of the prepolymer: glycidyl (meth)acrylate, isocyanatoethyl (meth)acrylate, hydroxyethyl (meth)acrylate, or (meth)acrylic acid.

The polyester is not particularly limited, and may be a polyester resin that can easily be produced by a known process.

The weight-average molecular weight of the polymeric compound having substituents each having an ethylenically unsaturated bond, is preferably within the range from 20,000 to 100,000, more preferably within the range from 30,000 to 80,000, the molecular weight being a molecular weight in terms of polystyrene obtained by gel permeation chromatography.

The ethylenically unsaturated bond concentration in the polymeric compound having substituents each having an ethylenically unsaturated bond is preferably within the range from 0.3 to 0.5 mol/kg. If this concentration is 0.3 mol/kg or more, end regions of the light-modulating film are easily treated so that the corresponding transparent electrodes are not short-circuited and a tendency that the electrical reliability is poor is not generated. In contrast, if this concentration is 0.5 mol/kg or less, the cured polymeric medium is not easily dissolved into the dispersing medium constituting the droplets of the light-modulating suspension so as to avoid a matter that the dissolved polymeric medium hinders the movement of the light-modulating particles in the droplets to lower the light-modulating performance.

The ethylenically unsaturated bond concentration in the polymeric compound having substituents each having an ethylenically unsaturated bond is obtained by the ratio between the integrated intensities of hydrogen according to NMR. The concentration is also obtained by calculation when the conversion ratio of the charged starting materials into the polymeric compound is known.

In the case of using the polymeric compound having substituents each having the ethylenically unsaturated bond, a polymerization initiator which is irradiated with an energy ray to activate radical polymerization can be used. Specific examples of the usable initiator include 2,2-dimethoxy-1,2-diphenylethane-1-one, 1-(4-(2-hydroxyethoxy)phenyl)-2-hydroxy-2-methyl-1-propane-1-one, bis(2,4,6-trimethylbenzoyl)phenylphosphineoxide, and 2-hydroxy-2-methyl-1-phenylpropane-1-one, and (1-hydroxycyclohexyl)phenyl ketone.

The use amount of the photopolymerization initiator is preferably within the range from 0.05 to 20 parts by mass relative to 100 parts by mass of the polymeric compound having substituents each having the ethylenically unsaturated bond, more preferably within the range from 0.1 to 5 parts by mass therefor.

Besides the polymeric compound having substituents each having the ethylenically unsaturated bond, an organic-solvent-soluble resin or a thermoplastic resin may be used together. An example of the resin is polyacrylic acid or polymethacrylic acid which has a weight-average molecular weight within the range of 1,000 to 100,000, the molecular weight being a molecular weight in terms of polystyrene measured by gel permeation chromatography.

An additive, such as a coloration inhibitor such as dibutyltin dilaurate, may be added into the polymeric medium if necessary. The polymeric medium may contain a solvent. The solvent may be tetrahydrofuran, toluene, heptane, cyclohexane, ethyl acetate, ethanol, methanol, isoamyl acetate, hexyl acetate or the like.

<3>Light-Modulating Material

The light-modulating material is obtained as a mixed liquid by mixing a liquid light-modulating suspension with a polymeric medium homogeneously and dispersing the light-modulating suspension, in the state of droplets, in the polymeric medium.

Specifically, this manner is as follows: A light-modulating suspension is produced by mixing a liquid wherein light-modulating particles are dispersed in a solvent with a dispersing medium of the light-modulating suspension, and then distilling off the solvent by means of a rotary evaporator or the like.

Next, the light-modulating suspension and a polymeric medium are mixed with each other to prepare a mixed liquid (light-modulating material) wherein the light-modulating suspension is dispersed, in the state of droplets, in the polymeric medium.

In the light-modulating material in the invention, the light-modulating suspension is contained preferably in an amount within the range from 1 to 100 parts by mass, more preferably within the range from 4 to 70 parts by mass, even more preferably within the range from 6 to 60 parts by mass, in particular preferably within the range from 8 to 50 parts by mass relative to 100 parts by mass of the polymeric medium.

<Light-Modulating Film>

<4>Light-Modulating Layer

The light-modulating layer in the invention can be formed by curing a light-modulating material as described above, which contains: a polymeric medium for forming a resin matrix; and a light-modulating suspension.

The thickness of the light-modulating layer in the light-modulating film is not particularly limited, and is generally within the range from 5 to 1,000 μm. In order for the film to exhibit a sufficient light-modulating performance, the thickness is preferably within the range from 10 to 200 μm. The light transmittance of the light-modulating film can be adjusted by varying the blend ratio between the polymeric medium which is to be a resin matrix, and the light-modulating suspension which is a liquid form, into various values.

In the resultant light-modulating layer, the size (average particle diameter) of the droplets of the light-modulating suspension that are dispersed in the resin matrix is preferably within the range from 0.5 to 50 μm, more preferably within the range from 1 to 10 μm from the viewpoint of the prevention of the aggregation and deposition of the light-modulating particles.

The average droplet diameter can be calculated, for example, by using an optical microscopy to take a photograph or some other image of the light-modulating film from the direction toward one of its surfaces, measuring the diameters of arbitrarily-selected ones out of droplets therein, and then getting the average value thereof. The diameter can also be calculated by taking a viewing field image of the light-modulating film through an optical microscope, as digital data, into a computer, and then applying an image processing integration software thereto.

<5>Transparent Resin Substrates

Each of the transparent resin substrates in the invention is not particularly limited as far as the substrate has electroconductivity for the application of an electric field for expressing a light-modulating function. In the invention, the transparent resin substrate is preferably in a form that a transparent electroconductive film is formed on a surface thereof for the application of an electric field for expressing a light-modulating function. The transparent electroconductive film is, for example, a film made of indium tin oxide (ITO), $SnO_2$, $In_2O_3$, or the like. When the transparent electroconductive film is formed on the transparent resin substrate, the surface electrical resistance value thereof is preferably within the range from about 3 to 3000Ω.

The resin of the body of the transparent resin substrate is not particularly limited in kind as far as the resin has a sufficient transparency and can sufficiently bond to the transparent electroconductive film or the light-modulating layer. The body is, for example, a film of a polyester such as polyethylene terephthalate, a film of a polyolefin such as polypropylene, a polyvinyl chloride film, an acrylic resin film, or some other resin film. A polyethylene terephthalate film is particularly preferred since the film is excellent in transparency, formability, bondability, workability, and others.

Such a transparent resin substrate may be a commercially available product, such as a product commercially available under a trade name of 300R (manufactured by Toyobo Co., Ltd.), or under a trade name of ITO/PET FILM 155954 (manufactured by Sheldahl Co.).

The thickness of the transparent electroconductive film is not particularly limited, and is preferably within the range from 10 to 5,000 nm. In order to prevent a short-circuit phenomenon generated by a matter that the gap between the substrates is narrow so that the incorporation of a contaminant, and others are generated, it is allowable to use substrates in each of which a transparent insulating layer having a thickness of 200 to 1,000 angstroms (Å) is formed on a transparent electroconductive film.

The light transmittance of the transparent resin substrate is preferably 80% or more from the viewpoint of light-modulating performance. The light transmittance of the transparent resin substrate can be measured in accordance with the method for measuring total light ray transmittance in JIS K7105.

<6>Light-Modulating Film

The light-modulating film in the invention includes a light-modulating layer formed by using a light-modulating material containing a polymeric medium for forming a resin matrix and a light-modulating suspension, so as to be cured; and transparent resin substrates between which the light-modulating layer is sandwiched.

<7>Method for Producing a Light-Modulating Film

The production is according to a method described below.

The invention is a method for producing a light-modulating film in which a light-modulating layer is sandwiched between two transparent resin substrates, the light-modulating layer being formed by use of a light-modulating material containing: a polymeric medium for forming a resin matrix; and a light-modulating suspension, the method comprising the following steps (a) to (c):

The step (a) of applying the light-modulating material to one (a first transparent resin substrate) of the transparent resin substrates;

the step (b) of bonding the other transparent resin substrate (a second transparent resin substrate) onto the light-modulating material applied to the first transparent resin substrate; and the step (c) of irradiating the light-modulating material sandwiched between the first transparent resin substrate and the second transparent resin substrate with an energy ray to cure the polymeric medium forming the resin matrix contained in the light-modulating material, thereby forming the light-modulating layer to yield the light-modulating film.

The light-modulating material is applied to the first transparent resin substrate, and then the second transparent resin substrate is bonded thereto so as to interpose the light-modulating material therebetween before the light-modulating material is cured, thereby making it possible to block oxygen, which is a hindering factor against the curing of the polymeric medium for forming the resin matrix contained in the light-modulating material by the energy ray. In this way, at the time of the irradiation with the energy ray to cure the polymeric medium for forming the resin matrix contained in the light-modulating material, the polymerization inhibition based on oxygen can be prevented even when the irradiation is not conducted in a vacuum or in an inert gas atmosphere. By bonding the first transparent resin substrate and the second transparent resin substrate to each other to interpose the light-modulating material therebetween before the light-modulating material is cured, the adhesiveness between the light-modulating layer and the transparent resin substrate is made very good. Thus, the bonding in this manner is preferred.

It is preferred that the method further has, in the step (b), the step of pressing the workpiece from any one or both of the first transparent resin substrate side thereof and the second transparent resin substrate side thereof. Through this step, the adhesiveness between the light-modulating layer and the transparent resin substrate can be made higher. Moreover, when the transparent resin substrate is bonded to the light-modulating material, the incorporation of voids therein, and others can be avoided. The pressing in the step (b) will be described later.

The method for preparing the light-modulating material used in the light-modulating film producing method of the invention is not particularly limited, and the material is preferably prepared by use of the above-mentioned light-modulating suspension and the above-mentioned polymeric medium.

In the light-modulating film producing method of the invention, it is allowable to apply the light-modulating material to each of the first transparent resin substrate and the second transparent resin substrate, next bonding the two transparent resin substrates, on each of which the light-modulating material is applied, onto each other, and subsequently irradiating the workpiece with an energy ray, thereby curing the polymeric medium for forming the resin matrix to form a light-modulating layer.

The method for applying the light-modulating material to the transparent resin substrate in the step (a) is not particularly limited as far as the method is a method capable of applying the light-modulating material into a constant thickness. For example, the light-modulating material can be applied to the transparent resin substrate by use of a coating unit such as a bar coater, an applicator, a doctor blade, a roll coater, a die coater or a comma coater.

When the light-modulating material is applied, the light-modulating material may be diluted with an appropriate solvent if necessary. When the solvent is used, it is necessary that after the diluted material is applied to the substrate, the resultant is dried. The solvent may be, for example, tetrahydrofuran, toluene, heptane, cyclohexane, ethyl acetate, ethanol, methanol, isoamyl acetate, or hexyl acetate.

In the step (b) in the light-modulating film producing method of the invention, that is, the step of bonding the second transparent resin substrate onto the first transparent resin substrate to interpose the light-modulating material therebetween, it is preferred that the workpiece is pressed from either the first transparent resin substrate side thereof or the second transparent resin substrate side thereof.

The method for the pressing is not particularly limited as far as the method is a method cable of applying force uniformly. The method is, for example, a method wherein: at the time of bonding the second transparent resin substrate onto the light-modulating material applied to the first transparent resin substrate, a pressing roll is set to contact the workpiece on the second transparent resin substrate surface (the surface opposite to the surface contacting the light-modulating material) side thereof and at a fiducial point where the first transparent resin substrate and the second transparent resin substrate are to be bonded to each other to interpose the light-modulating material therebetween (the point may be referred to as "the bonding portion of the first transparent resin substrate and the second transparent resin substrate" hereinafter); and then a lamination which is to be the light-modulating film is pressed along the thickness direction thereof.

In this case, along the thickness of the lamination, which is to be the light-modulating film, specifically, along the direction perpendicular to the bonding surfaces of the second transparent resin substrate, the light-modulating material and the first transparent resin substrate, the lamination can be pressed from the second transparent resin substrate surface (the surface opposite to the surface contacting the light-modulating material) side thereof toward the first transparent resin substrate. Thus, without generating any pushing unevenness, force can be uniformly applied thereto. As a result, the light-modulating film can be produced to have less color unevenness and have a better external appearance. In the case of pressing the lamination from the first transparent resin substrate surface (the surface opposite to the surface contacting the light-modulating material) side thereof toward the second transparent resin substrate along the thickness direction of the lamination, which is to be the light-modulating film, the pressing roll is set to contact the lamination on the first transparent resin substrate surface (the surface opposite to the surface contacting the light-modulating material) side thereof.

In the step (b) in the light-modulating producing method of the invention, the workpiece, or the lamination, may be pressed from both of the first transparent resin substrate side thereof and the second transparent resin substrate side thereof. The method for the pressing is not particularly limited as far as the method is a method cable of applying force uniformly. The lamination can be pressed from both the sides thereof, for example, at the bonding portion of the second transparent resin substrate to the light-modulating material applied to the first transparent resin substrate, by setting two pressing rolls to contact with each other via the lamination on the first transparent resin substrate surface (the surface opposite to the surface contacting the light-modulating material) side thereof and on the second transparent resin substrate surface (the surface opposite to the surface contacting the light-modulating material) side thereof, respectively, whereby the two rolls were located on the two sides, respectively. In this case, the lamination can be pressed from both of the first transparent resin substrate surface side thereof and the second transparent resin substrate surface side thereof. Thus, the air tends not to be easily incorporated into the light-modulating material, and further the air incorporated at the time of the bonding of the second transparent resin substrate tends to be easily pushed out.

By the pressing in the step (b), the generation of voids can be prevented in the light-modulating film. The light-modulating film can be produced so as to have no color unevenness and have a very good external appearance.

In the step (c) in the light-modulating film producing method of the invention, it is preferred that the workpiece is irradiated with an energy ray from both of the first transparent resin substrate side thereof and the second transparent resin substrate side thereof. The method makes it possible to cure the polymeric medium for forming the resin matrix in the light-modulating material sufficiently and further prevent the aggregation of the light-modulating suspension in the interface between the light-modulating layer and the transparent resin substrate. Thus, the adhesiveness between the light-modulating layer and the transparent resin substrate tends to be improved.

The source for the energy ray may be, for example, a metal halide lamp or a high-pressure mercury lamp.

In the case of using, as the energy ray, for example, ultraviolet rays in the wavelength range of UV-A (about 320 to 390 nm), the totalized light quantity is preferably within the range from 500 to 4000 mJ/cm$^2$, more preferably within the range from 500 to 2000 mJ/cm$^2$, the quantity being the total of the totalized light quantities from both the sides. The illuminance is preferably within the range from 100 to 400 mW/cm$^2$, more preferably within the range from 250 to 300 mW/cm$^2$.

It is preferred that the first transparent resin substrate is wound out from a roll in the step (a), and the second transparent resin substrate is wound out from a roll in the step (b), and the method further includes the step of winding up the light-modulating film yielded in the step (c) around a roll.

This method makes it possible to produce a light-modulating film having a homogeneous light-modulating layer having a uniform film thickness continuously. The method also makes it possible to conduct continuously and constantly the light-modulating film producing steps: such as the winding-out of the first transparent resin substrate and the second transparent resin substrate; the application of the light-modulating material to the first transparent resin substrate; the bonding of the second transparent resin substrate; the irradiation with the energy ray; and the winding-up of the light-modulating film. Accordingly, the producing steps do not become complicated, and it is unnecessary to irradiate the workpiece with an energy ray in an inert gas atmosphere or in a vacuum. Thus, without using any large-scale apparatus, light-modulating films can be continuously produced which each have an external appearance uniform as a whole and a very good adhesiveness between a light-modulating layer and a transparent resin substrates.

The rate of the winding-out from each of the rolls, and that of the winding-up around the roll are each not particularly limited, and are each preferably within the range from, e.g., 0.5 to 100 m/minute since light-modulating films can be continuously produced which are each uniform, good in external appearance, and very good in the adhesiveness.

<8>Usage of the Light-Modulating Film

Conditions for exhibiting the light-modulating performance are not particularly limited. Usually, an alternating current power supply source is used to make the light-modulating film to act at 10 to 220 volts (effective value) in the frequency range of 30 Hz to 500 kHz.

The light-modulating film obtained by the producing method of the invention can be preferably used for, e.g., an indoor or outdoor partition; a window glass plate or skylight for building; various flat display elements used in the electronic industry and for imaging instruments; alternate products for various gauge boards and existing liquid crystal display elements; a light shutter; various indoor and outdoor advertisement and guide indicating boards; window glass plates for an aircraft, a railway vehicles and a ship; window glass plates, a back mirror and a sun roof for a car; glasses; sunglasses; a sun visor; and other articles. The light-modulating film is useful, in particular, for a substrate having a curved surface.

The using manner of the light-modulating film may be a direct use of the light-modulating film. For example, the using manner may be a manner in which the light-modulating film is sandwiched between two substrates, a manner in which the light-modulating film is adhered onto a single surface of a substrate, or some other manner. The substrate may be a glass plate. In the invention, the glass plate means a substrate transparent to visible rays or the like. Examples thereof include any ordinary glass plate, which is made mainly of silicon dioxide, any glass plate made of an inorganic material that may have various compositions, and any resin glass plate made of an organic material such as a transparent acrylic resin or polycarbonate resin.

When the light-modulating film of the invention is used, in particular, when the film is applied to a glass piece having a curved surface, a light-modulating glass can be obtained, the light-modulating glass having the film following capability, no nonuniformity in light-modulating performance, and a uniform external appearance as a whole and a uniform and stable light-modulating performance.

In the case of using a method which is a conventional technique and is dependent on an emulsion using water in the production of a light-modulating film wherein a liquid crystal is used, the liquid crystal reacts with water so that light-modulating property is lost in many cases. Thus, there is caused a problem that films having the same properties are not easily produced.

In the invention, a liquid crystal is not used but a light-modulating suspension in a liquid form, wherein light-modulating particles are dispersed in the light-modulating suspension, is used; thus, even when no electric field is applied thereto, light is not scattered and a coloration state that an excellent vividness is given and a viewing angle is not restricted is generated, which is different from the situation according to any light-modulating film using a liquid crystal. The variability degree of light can be adjusted at will by adjusting the content of the light-modulating particles, the form of the droplets, or the thickness of the film, or by adjusting the electric field intensity.

In the light-modulating film of the invention, no liquid crystal is used; therefore, the following are overcome: a change in the color tone and a fall in the variable ability that are based on the irradiation with ultraviolet rays; and a response time lag following a voltage drop generated between the periphery of the transparent resin substrates and the center thereof, the lag being peculiar to large-sized products.

The structure and the operation of the light-modulating film obtained by the light-modulating producing method of the invention will be described in more detail with reference to the drawings, FIG. 1 is a schematic view of the structure of a light-modulating film of an embodiment of the invention. A light-modulating layer 1 is sandwiched between two transparent electroconductive substrates 4 each made of a transparent resin substrate 6 coated with a transparent electroconductive film 5. By switching a switch 8, a power source 7 is connected or disconnected to the two transparent electroconductive films 5. The light-modulating layer 1 is composed of: a resin matrix 2 obtained by curing a polymer; and a liquid-form light-modulating suspension dispersed, in the form of droplets 3, in the resin matrix 2.

Figure 2:
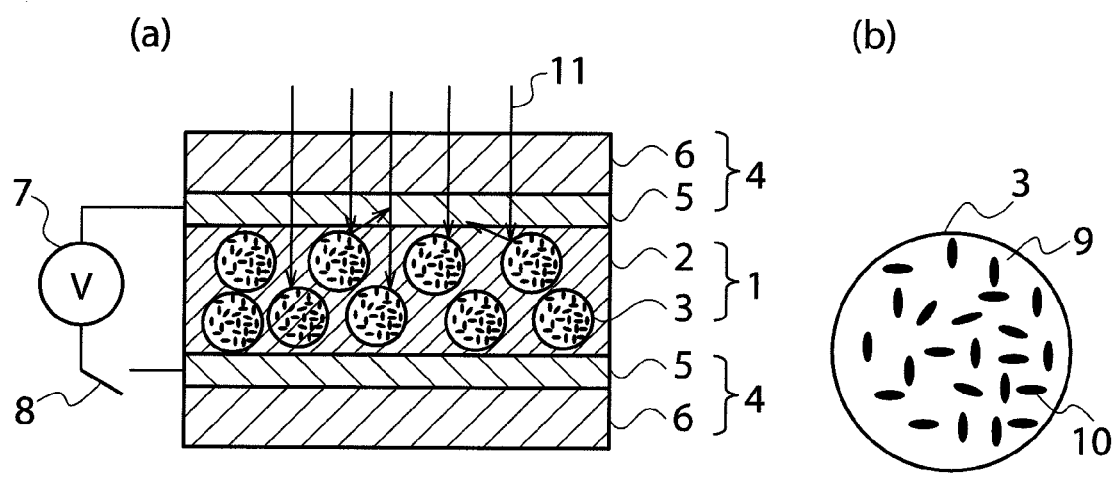
FIG. 2(a) is a schematic view referred to in order to describe the action of the light-modulating film when no electric field is applied thereto.
FIG. 2(b) is an enlarged view of a droplet.

FIG. 2 are each a schematic view referred to in order to describe the operation of the light-modulating film in FIG. 1, and each illustrate a case where the switch 8 is turned off to apply no electric field. In this case, incident rays 11 are absorbed, scattered or reflected in or on light-modulating particles 10 dispersed in a dispersing medium 9 constituting the droplets 3 of the liquid-form light-modulating suspension by Brownian movement of the light-modulating particles 10. Thus, the rays 11 cannot be transmitted.

Figure 3:
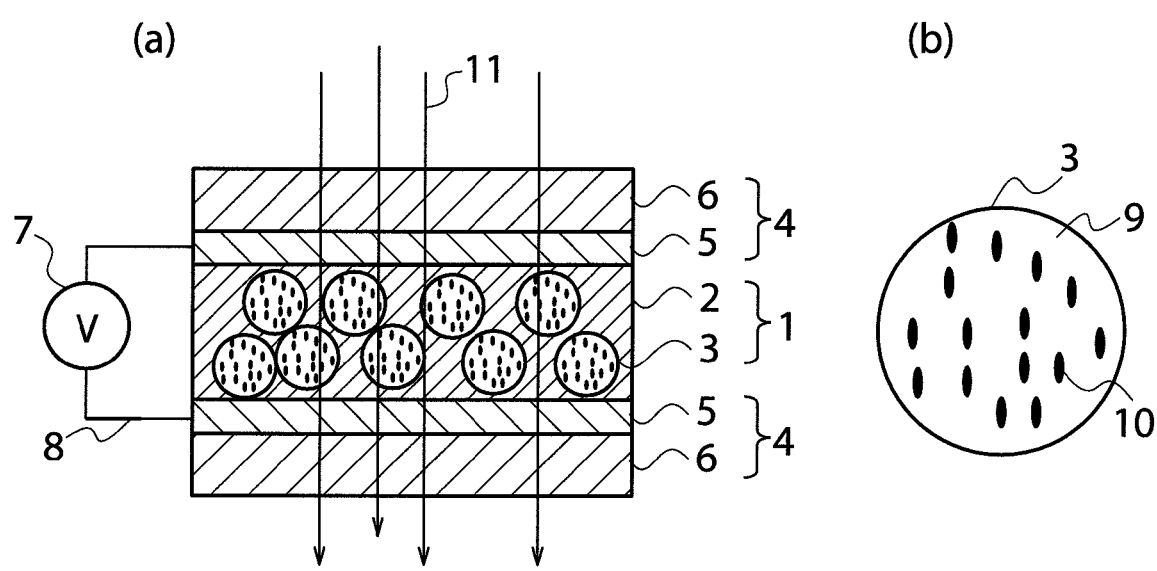
FIG. 3(a) is a schematic view referred to in order to describe the action of the light-modulating film when an electric field is applied thereto.
FIG. 3(b) is an enlarged view of a droplet.

As illustrated in FIG. 3, however, when the switch 8 is connected to apply an electric field, the light-modulating particles 10 are arranged in parallel to an electric field formed by the applied electric field so that the incident rays 11 come to pass between the arranged light-modulating particles 10. In this way, a light transmitting function which causes neither scattering nor a fall in the transparency is produced.

EXAMPLES

The invention will be more specifically described by way of examples of the invention and comparative examples hereinafter.

<Production Example of a Light-Modulating Material>

(Production Example of Light-Modulating Particles)

In order to produce light-modulating particles, in a 500 mL four-necked flask equipped with a stirrer and a condenser tube, 4.5 g of iodide (JIS extra pure reagent, manufactured by Wako Pure Chemical Industries, Ltd.) was dissolved in a solution composed of 87.54 g of a 15% by mass solution of nitrocellulose ¼ LIG (trade name, manufactured by Bergerac NC Co.), diluted with isoamyl acetate (extra pure reagent, manufactured by Wako Pure Chemical Industries, Ltd.), 44.96 g of isoamyl acetate, 4.5 g of dehydrated $CaI_2$ (for chemistry, manufactured by Wako Pure Chemical Industries, Ltd.), 2.0 g of anhydrous ethanol (for organic synthesis, manufactured by Wako Pure Chemical Industries, Ltd.), and purified water (purified water, manufactured by Wako Pure Chemical Industries, Ltd.), and then thereto was added 3 g of pyrazine-2,5-dicarboxylic acid dihydrate (manufactured by PolyCarbon Industries), which was a base-forming material of the light-modulating particles. The resultant was stirred at 45° C. for 3 hours to terminate the reaction, and then was dispersed by means of an ultrasonic disperser. At this time, the color tone of the mixed liquid changed from brown to navy blue.

Next, in order to take out light-modulating particles having specified sizes from the reaction solution, a centrifugal separator was used to separate them from other light-modulating particles. The reaction solution was centrifuged at a rate of 750 G for 10 minutes to remove the precipitation. Furthermore, the solution was centrifuged at a rate of 7390 G for 2 hours to remove the floated materials, and the precipitation particles were collected. The precipitation particles were made of a needle crystal having an average particle diameter of 0.36 μm, the diameter being measured by means of a submicron particle analyzer (N4MD, manufactured by Beckman Coulter, Inc.). The precipitation particles were used as the light-modulating particles.

(Production Example of a Light-Modulating Suspension)

The light-modulating particles yielded in the item (Production example of light-modulating particles), the amount of which was 45.5 g, was added to 50 g of a copolymer of butyl acrylate (Wako extra pure reagent, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class reagent, manufactured by Wako Pure Chemical Industries, Ltd.) (ratio by mole between the monomers: 18/1.5/0.5, weight-average molecular weight: 2,000, refractive index: 1.4719 as the dispersing medium of the light-modulating suspension), and then a stirrer was used to mix the components with each other for 30 minutes. Next, a rotary evaporator was used to remove isoamyl acetate at 80° C. in a vacuum under a reduced pressure of 133 Pa for 3 hours to produce a stable liquid-form light-modulating suspension wherein the light-modulating particles neither precipitated nor aggregated.

(Production Example of an Energy Ray Curable Silicone Resin)

Into a four-necked flask equipped with a Dean-Stark trap, a condenser tube, a stirrer and a heating device were charged 17.8 g of silanol-both-terminated polydimethylsiloxane (reagent, manufactured by Chisso Corp.), 62.2 g of silanol-both-terminated polydimethyldiphenylsiloxane (reagent, manufactured by Chisso Corp.), 20 g of (3-acryloxypropyl)methyldimethoxyislane (reagent, manufactured by Chisso Corp.), and 0.1 g of tin 2-ethylhexane (manufactured by Wako Pure Chemical Industries, Ltd.). In heptane, the solution was refluxed at 100° C. for 3 hours to conduct a reaction.

Next, thereto was added 25 g of trimethylethoxysilane (reagent, manufactured by Chisso Corp.), and the resultant was refluxed for 2 hours to cause a dealcoholization reaction, and then a rotary evaporator was used to remove heptane in a vacuum under a reduced pressure of 100 Pa at 80° C. for 4 hours to yield an energy ray curable silicone resin having a weight-average molecular weight of 35000, and a refractive index of 1.4745. From the hydrogen integrated-intensity ratio according to NMR, the concentration of ethylenically unsaturated bonds in this resin was 0.31 mol/kg. The ethylenically unsaturated bond concentration was measured by a method described below.

[Method for Measuring the Ethylenically Unsaturated Bond Concentration]

The ethylenically unsaturated bond concentration (mol/kg) was calculated from the hydrogen integrated-intensity ratio according to NMR (using an integrated value of hydrogen in the ethylenically unsaturated bond near 6 ppm, an integrated value of hydrogen in phenyl groups near 7.5 ppm, and an integrated value of hydrogen in methyl groups near 0.1 ppm). The solvent for the measurement was rendered $CDCl_3$. In the resin produced as described above, the ratio by mass calculated out from the hydrogen integrated-intensity ratio according to NMR was as follows: the methyl groups/the phenyl groups/the ethylenically unsaturated groups was 11/6.4/1. The proportion of the ethylenically unsaturated groups in the whole was 5.4%, and the number of the ethylenically unsaturated groups per molecule was 9.35 from the individual molecular weights. Thus, the mole number per kilogram was calculated into 0.31 mol/kg.

(Production Example of a Light-Modulating Material)

The light-modulating suspension yielded in the item (Production example of a light-modulating suspension), the weight of which was 2.5 g, was added to 10 g of the energy ray curable silicone resin yielded in the item (Production example of an energy ray curable silicone resin), 0.2 g of bis(2,4,6-trimethylbenzoyl)phenylphosphineoxide (manufactured by Ciba Specialty Chemicals Inc.) as a photopolymerization initiator, and 0.3 g of dibutyltin dilaurate as a coloration inhibitor, and then the components were mechanically mixed with each other for 1 minute to produce a light-modulating material.

<Production Examples of a Light-Modulating Film>

Example 1

A polyethylene terephthalate film coated with a transparent electroconductive film (thickness: 300 Å) made of ITO (indium tin oxide) and having a surface electrical resistance value of 200 to 300Ω (trade name: 300R, manufactured by Toyobo Co., Ltd., thickness: 125 μm) (first transparent resin substrate) was wound out from a roll thereof, and then a die coater was used to apply the light-modulating material to the film at an application rate (film-winding-out rate) of 2 m/minute to give a dry film thickness of 90 μm.

Next, a polyethylene terephthalate film (second transparent resin substrate) identical to the first transparent resin substrate was bonded onto the applied light-modulating material. At this time, a pressing roll was set to contact the workpiece on the second transparent resin substrate surface (the surface opposite to the surface contacting the light-modulating material) side thereof and at the bonding portion of the first transparent resin substrate and the second transparent resin substrate, and the lamination, which was to be a light-modulating film, was pressed along the thickness direction thereof.

Thereafter, metal halide lamps, the power of which was adjusted to 80 mW/cm, were set on both of the first transparent resin substrate side and the second transparent resin substrate side of the lamination, respectively, and the lamination was irradiated with ultraviolet rays giving a totalized light quantity (totalized quantity from the two metal halide lamps) of 4000 mJ/cm² (measured with a UV Power Pack S/N 8601 UV-A (320-390 nm) manufactured by Fusion UV Systems, Inc.) to produce a light-modulating film having a formed light-modulating layer wherein the light-modulating suspension was cured, in the form of spherical droplets, in the silicone resin by the ultraviolet rays so as to be dispersed.

Example 2

A light-modulating film was produced in the same way as in Example 1 except that when the second transparent resin substrate was bonded onto the light-modulating material applied to the first transparent resin substrate at the bonding portion of the first transparent resin substrate and the second transparent resin substrate, two pressing rolls were set to contact with each other via the lamination on the first transparent resin substrate surface (the surface opposite to the surface contacting the light-modulating material) side thereof and on the second transparent resin substrate surface (the surface opposite to the surface contacting the light-modulating material) side thereof, respectively, whereby the two rolls were located on the two sides, respectively; and the lamination, which was to be the light-modulating film, was pressed from both sides thereof along the thickness direction thereof.

Comparative Example 1

A die coater was used to apply the light-modulating material produced as described above to a polyethylene terephthalate film coated with a transparent electroconductive film (thickness: 300 Å) made of ITO (indium tin oxide) and having a surface electrical resistance value of 200 to 300Ω/Sq (trade name: 300R, manufactured by Toyobo Co., Ltd., thickness: 125 μm) (first transparent resin substrate), so as to give a dry film thickness of 90 μm. Thereafter, in an atmosphere purged sufficiently with nitrogen, metal halide lamps, the power of which was adjusted to 80 mW/cm, were set on both of the first transparent resin substrate side and the light-modulating material applied surface side of the lamination, respectively. The lamination was then irradiated with ultraviolet rays giving a totalized light quantity (totalized quantity from the two metal halide lamps) of 4000 mJ/cm$^2$ (measured with a UV Power Pack S/N 8601 UV-A (320-390 nm) manufactured by Fusion UV Systems, Inc.).

Next, the same polyethylene terephthalate film (second transparent resin substrate) as described above was bonded thereon by means a laminator.

The light-modulating film produced in each of Examples and Comparative Example described above was used to make evaluations about the bonding strength, the color unevenness, the light transmittance and the contrast thereof. The results are shown in Table 1.

<Method for Measuring the Bonding Strength of the Light-Modulating Layer>

A rheometer, STROGRAPH E-S (manufactured by Toyo Seiki Co., Ltd.), was used to measure the bonding strength at a peel angle of 90°, an applied load of 50 N and a pulling-up speed of 50 mm/min. The bonding strength was the bonding strength based on a breaking mode in the present test, where each of the light-modulating films was used.

<Color Unevenness>

About the light-modulating film yielded in each of Examples and Comparative Example described above, the evenness of the density (the density difference) was observed with the naked eye by use of an inspecting reflector plate when no electric field was applied to the light-modulating film. An evaluation criterion therefor is as follows:

◯: The color was even.

X: The color was partially uneven, but was substantially even as a whole.

<Light Transmittance and Contrast>

Measurements were made about the light transmittance of the light-modulating film yielded in each of Examples and Comparative Example described above when no electric field was applied thereto, and that when an electric field giving a 400-Hz alternating voltage of 100 V (effective value) was applied thereto. About each of the light transmittances of the light-modulating film, a spectroscopic color-difference meter (SZ-Σ90, manufactured by Nippon Denshoku Industries Co., Ltd.) was used to measure the Y value (%) under conditions that an A light source was used and the viewing angle was set to 2 degrees. The Y value was used as the light transmittance. The contrast was calculated by subtracting the light transmittance when no electric field was applied from the light transmittance when the electric field was applied.

| Items | Bonding Strength (N/m) | Color Unevenness (External Appearance) | Light Transmittance (%) (Off) | (On) | Contrast |
|---|---|---|---|---|---|
| Example 1 | 1.0 (Aggregation Breaking) | ◯ | 0.9 | 52.3 | 51.4 |
| Example 2 | 1.4 (Aggregation Breaking) | ◯ | 0.8 | 51.1 | 50.3 |
| Comparative Example 1 | 0.5 (Interfacial Breaking) | x | 0.6 | 50.1 | 49.5 |

Industrial Applicability

According to the light-modulating film producing method of the invention, a light-modulating film can be obtained which has a wholly uniform external appearance and an excellent adhesiveness between its light-modulating layer and transparent resin substrate.

The invention claimed is:

1. A method for producing a light-modulating film in which a light-modulating layer is sandwiched between two transparent resin substrates, the light-modulating layer being formed by use of a light-modulating material containing: a polymeric medium for forming a resin matrix; and a light-modulating suspension, the method comprising the steps of:

the step (a) of applying the light-modulating material to one (a first transparent resin substrate) of the transparent resin substrates;

the step (b) of bonding the other transparent resin substrate (a second transparent resin substrate) onto the light-modulating material applied to the first transparent resin substrate to obtain a lamination; and the step (c) of irradiating the light-modulating material sandwiched between the first transparent resin substrate and the second transparent resin substrate with an energy ray to cure the polymeric medium for forming the resin matrix contained in the light-modulating material, thereby forming the light-modulating layer to yield the light-modulating film, wherein the step b) is performed before the step c), and
wherein the lamination is pressed from either the first transparent resin substrate side thereof or from the second transparent resin substrate side thereof, or
the lamination is pressed from both of the first transparent resin substrate side thereof and the second transparent resin substrate side thereof in the step (b).

2. The method for producing a light-modulating film according to claim 1, further comprising a step of applying the light-modulating material to the second transparent resin substrate before the step (b).

3. The method for producing a light-modulating film according to claim 1, wherein the lamination is pressed from both of the first transparent resin substrate side thereof and the second transparent resin substrate side thereof in the step (b).

4. The method for producing a light-modulating film according to claim 1, wherein the lamination is irradiated with the energy ray from both of the first transparent resin substrate side thereof and the second transparent resin substrate side thereof in the step (c).

5. The method for producing a light-modulating film according to claim 1, wherein the first transparent resin substrate is wound out from a roll in the step (a), and the second transparent resin substrate is wound out from a roll in the step (b),
the method further comprising the step of winding up the light-modulating film yielded in the step (c) around a roll.

6. A light-modulating film produced by the light-modulating film producing method according to claim 1.

7. The method for producing a light-modulating film according to claim 1,
wherein the light-modulating suspension contains light-modulating particles and a dispersing medium, the light-modulating particles being at least one selected from the group consisting of polyperiodides, inorganic fibers, carbon nanotubes, metal-free phthalocyanines and metal phthalocyanines.

8. The method for producing a light-modulating film according to claim 1,
wherein at least one of the transparent resin substrates includes a transparent electroconductive film made of at least one selected from the group of consisting of indium tin oxide (ITO), $SnO_2$ and $In_2O_3$.

9. A method for producing a light-modulating film in which a light-modulating layer including a light-modulating material is sandwiched between two transparent resin substrates, the method comprising steps of:
applying a light-modulating material to a first transparent resin substrate, the light-modulating material including a light-modulating suspension dispersed in a polymeric medium;
forming a lamination by bonding a second transparent resin substrate onto the light-modulating material applied to the first transparent resin substrate; and
irradiating the light-modulating material sandwiched between the first transparent resin substrate and the second transparent resin substrate to cure the polymeric medium and form a resin matrix containing the light-modulating suspension, thereby forming a light-modulating layer to yield a light-modulating film,
wherein the step of forming the lamination is performed before the step of irradiating the light-modulating material, and
wherein the step of forming the lamination includes pressing the first transparent resin substrate toward the second transparent resin substrate,
pressing the second transparent resin substrate toward the first transparent resin substrate, or
pressing the first transparent resin substrate toward the second transparent resin substrate and pressing the second transparent resin substrate toward the first transparent resin substrate.

10. The method for producing a light-modulating film according to claim 9, further comprising applying light-modulating material to the second transparent resin substrate before the step of forming the lamination.

11. The method for producing a light-modulating film according to claim 9, wherein the step of forming the lamination includes pressing the first transparent resin substrate toward the second transparent resin substrate and pressing the second transparent resin substrate toward the first transparent resin substrate.

12. The method for producing a light-modulating film according to claim 9, wherein the step of irradiating the light-modulating material includes applying radiation through both of the first transparent resin substrate and the second transparent resin substrate.

13. The method for producing a light-modulating film according to claim 9, wherein the step of applying light-modulating material to the first transparent resin substrate includes winding out the first transparent resin substrate from a first roll, and the step of forming the lamination includes winding out the second transparent resin substrate from a second roll.

14. The method for producing a light-modulating film according to claim 13, further comprising winding up the light-modulating film around a third roll.

15. The method for producing a light-modulating film according to claim 9, further comprising winding up the light-modulating film around a roll.

16. The light-modulating film produced by the method for producing a light-modulating film according to claim 9.

17. The method for producing a light-modulating film according to claim 9, wherein the resin matrix contains droplets of the light-modulating suspension.

18. The method for producing a light-modulating film according to claim 9,
wherein the light-modulating suspension contains light-modulating particles and a dispersing medium, the light-modulating particles being at least one selected from the group consisting of polyperiodides, inorganic fibers, carbon nanotubes, metal-free phthalocyanines and metal phthalocyanines.

19. The method for producing a light-modulating film according to claim 9,
wherein at least one of the transparent resin substrates includes a transparent electroconductive film made of at least one selected from the group of consisting of indium tin oxide (ITO), $SnO_2$ and $In_2O_3$.

* * * * *